Aug. 18, 1953  D. K. RANDAL  2,649,005
RESILIENT CLAMP FOR INSTALLING TIRE CHAINS
Filed Jan. 23, 1950
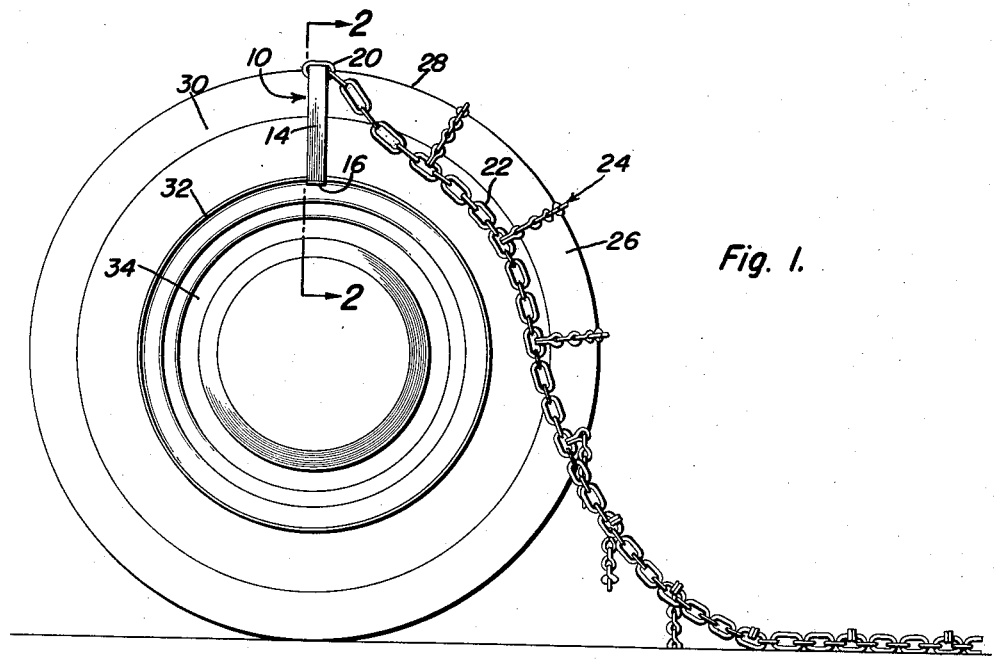
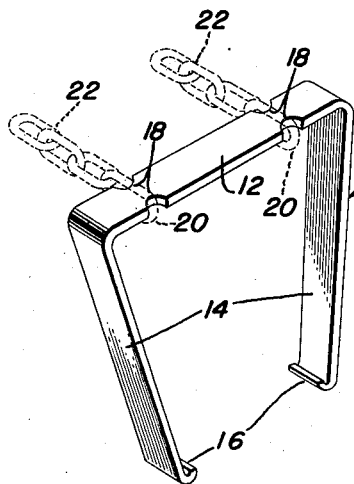
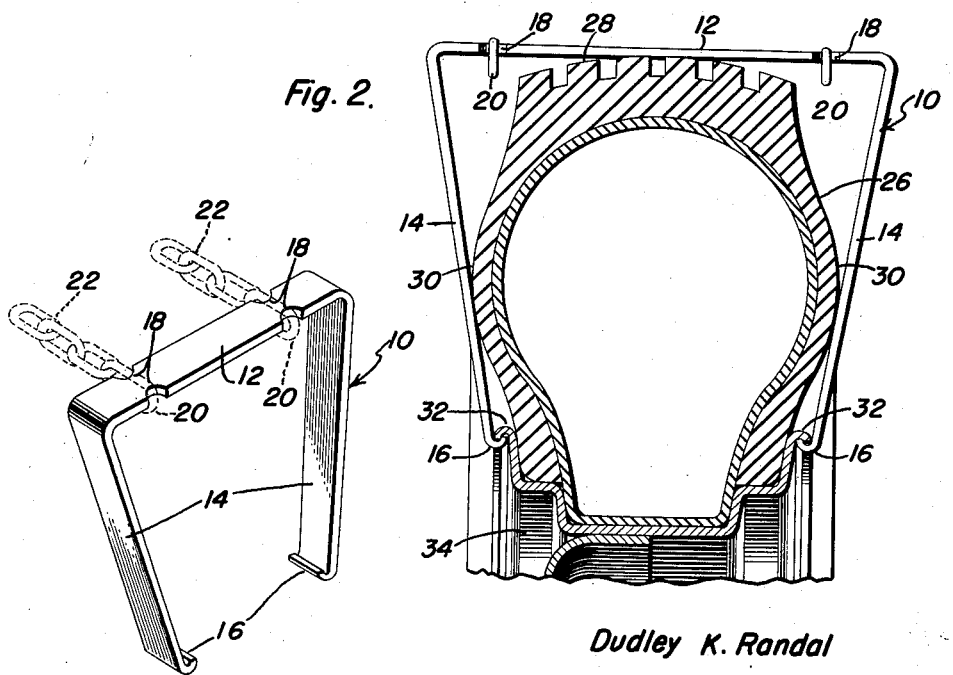
Dudley K. Randal
INVENTOR.

Patented Aug. 18, 1953

2,649,005

UNITED STATES PATENT OFFICE 2,649,005

RESILIENT CLAMP FOR INSTALLING TIRE CHAINS

Dudley K. Randal, Kennewick, Wash.

Application January 23, 1950, Serial No. 140,021

1 Claim. (Cl. 81—15.8)

This invention relates to new and useful improvements and structural refinements in devices for installing anti-skid chain units on tires of automobiles, trucks, and similar vehicles, and the principal object of the invention is to provide a device of the character herein described, with the assistance of which the chain installing operation may be quickly, easily and conveniently effected.

This object is achieved by the provision of a resilient bracket which is adapted to have free end portions of a tire chain unit attached thereto and is intended to be positioned on the tire for the purpose of holding one end of the chain unit to the tire so that the vehicle may subsequently be driven to effect substantially one revolution of the wheel and cause the chain unit to wind itself, so to speak, around the peripheral portion of the tire.

An important feature of the invention resides in the provision of means on the aforementioned bracket for engaging the rim portion of the wheel, whereby the bracket is firmly yet removably retained in position on the tire.

Some of the advantages of the invention lie in its simplicity of construction, in its convenient and expeditious operation as aforesaid, and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a side elevational view showing the invention in use during installation of a chain unit on the tire of a wheel;

Figure 2 is a cross-sectional view, taken substantially in the plane of the line 2—2 in Figure 1; and Figure 3 is a perspective view of the invention per se, illustrating, in dotted line, end portions of the chain unit.

Like characters of reference are employed to designate like parts in the specification and throughout the several views.

Referring now to the accompanying drawings in detail, the invention consists of a device for use in installing anti-skid chain units on tires of vehicle wheels, this device consisting of a substantially U-shaped bracket designated generally by the reference character 10, affording a transverse bight portion 12 and a pair of side members or arms 14 which may, if desired, be mutually convergent toward their free ends, where they terminate in a pair of inwardly arcuated hooks 16, as will be clearly apparent.

The entire bracket 10 is constructed from resilient material, and it is to be noted that the bight portion 12 of the bracket is provided with sets of notches constituting seats 18 for a pair of free links 20 at the ends of the usual longitudinal chain members 22 of an anti-skid chain unit 24.

It is to be understood that the hooks 16 are of a size to permit the links 20 to be passed over them and over the arms 14 into the seats 18 in the bight portion 12, whereupon the resilient arms 14 of the bracket are spread apart and the bracket is applied to a tire 26 with the bight portion 12 extending transversely of the tire tread 28 while intermediate portions of the arms 14 frictionally engage the side walls 30 of the tire after the spreading action on the arms is discontinued.

The arms 14 are of such length that the hooks 16 at the ends thereof are engaged with the usual outturned rim portions 32 at the opposite sides of a wheel 34 on which the tire 26 is mounted, the resiliency of the bracket 10, of course, being such as to urge the arms 14 together and the hooks 16 in engagement with the rim portions of the wheel.

With the device so applied, the associated vehicle may then be driven for a short distance so as to effect substantially a complete revolution of the wheel so that the chain unit 24 will wind itself, so to speak, around the tire. The hooks 16 of the bracket 10 then may be disengaged from the wheel and the bracket removed from the tire, whereupon the links 20 themselves may be disengaged from the bracket and connected to similar, corresponding links (not shown) at the remaining end of the chain unit in a conventional manner.

It is believed that the advantages and use of the invention will be clearly apparent from the foregoing disclosure, and accordingly further description thereof at this point is deemed unnecessary.

Having described the invention, what is claimed as new is:

A device for attaching anti-skid chains to a tire mounted on a flanged rim, said device being formed integrally from a single strap of resilient material and comprising a straight intermediate member, said intermediate member being of greater length than the transverse width of the mounted tire whereby spaces for a user's hands are provided between the side members and the tire adjacent the intermediate member, a pair of straight and mutually convergent side members extending from the respective opposite ends of said intermediate member, the edges of said intermediate member and said side member being coplanar, and a pair of inturned opposing hooks provided at the free ends of said side members, said intermediate member being provided in its opposite side edge portions and at points spaced inwardly from said side members with pairs of registering notches to receive links of a chain.

DUDLEY K. RANDAL.

References Cited in the file of this patent

UNITED STATES PATENTS

| Number | Name | Date |
| --- | --- | --- |
| 1,266,507 | Ludwig | May 14, 1918 |
| 1,499,036 | Smith | June 24, 1924 |
| 1,500,409 | Melton et al. | July 8, 1924 |
| 1,571,764 | Edwards | Feb. 2, 1926 |
| 2,076,894 | Johnson | Apr. 13, 1937 |
| 2,100,819 | Sailey | Nov. 30, 1937 |
| 2,175,395 | Hewel | Oct. 10, 1939 |
| 2,299,185 | Smola | Oct. 20, 1942 |
| 2,478,335 | Stark | Aug. 9, 1949 |
| 2,507,376 | Klein | May 9, 1950 |